(12) United States Patent
Kovilpattii et al.

(10) Patent No.: US 10,255,576 B2
(45) Date of Patent: Apr. 9, 2019

(54) COMPUTER IMPLEMENTED METHOD AND SYSTEM TO IDENTIFY LEADERS IN VARIOUS WORKGROUPS

(71) Applicant: Tata Consultancy Services Ltd., Mumbai, Maharashtra (IN)

(72) Inventors: Suceendran Manoharan Kovilpattii, Chennai (IN); Saravanan Ramachandran, Chennai (IN); Santha Lakshmi Chittibabu, Chennai (IN); Dhilip Kumar, Chennai (IN); Prathap Karunakaran, Dharmapuri (IN)

(73) Assignee: Tata Consultancy Services Ltd., Mumbai (IN)

( * ) Notice: Subject to any disclaimer, the term of this patent is extended or adjusted under 35 U.S.C. 154(b) by 1210 days.

(21) Appl. No.: 14/493,998

(22) Filed: Sep. 23, 2014

(65) Prior Publication Data

US 2015/0170091 A1    Jun. 18, 2015

(30) Foreign Application Priority Data

Dec. 13, 2013  (IN) .......................... 3907/MUM/2013

(51) Int. Cl.
| | |
|---|---|
| *G06Q 10/00* | (2012.01) |
| *G06Q 10/06* | (2012.01) |
| *G06F 9/451* | (2018.01) |
| *G06F 3/0484* | (2013.01) |
| *G06Q 10/10* | (2012.01) |
| *H04L 29/08* | (2006.01) |
| *H04L 29/06* | (2006.01) |

(52) U.S. Cl.
CPC ... *G06Q 10/06398* (2013.01); *G06F 3/04847* (2013.01); *G06F 9/451* (2018.02); *G06Q 10/06316* (2013.01); *G06Q 10/063112* (2013.01); *G06Q 10/10* (2013.01); *H04L 65/403* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 6,275,812 | B1 * | 8/2001 | Haq ....................... | G06Q 10/06 705/7.14 |
| 7,155,399 | B2 * | 12/2006 | Andre .............. | G06Q 10/06311 705/7.14 |

(Continued)

*Primary Examiner* — Gurkanwaljit Singh
(74) *Attorney, Agent, or Firm* — Blueshift IP, LLC; Robert Plotkin

(57) ABSTRACT

A computer implemented system and method for identifying leaders in an organization. The system includes two repositories; first that stores information related to existing/known leaders and second that stores tacit and explicit knowledge related to the employees. The repositories store relevant attributes and attribute values of employees and known leaders according to their ranking in their field of activity, to form a digital persona. The digital persona of known leaders is then compared with the digital persona of an employee suitable for the leadership to form a leadership score. A leader is then chosen based on the leadership ranking which is based on leadership score. Thus, the employees, based on circumstances, may get more opportunities to prove their leadership abilities as the leadership ranking changes periodically.

10 Claims, 1 Drawing Sheet

(56) References Cited

U.S. PATENT DOCUMENTS

| | | | | |
|---|---|---|---|---|
| 7,155,400 B1* | 12/2006 | Jilk | G06Q 10/06 | 705/7.14 |
| 7,181,413 B2* | 2/2007 | Hadden | G06Q 10/06398 | 434/107 |
| 7,254,546 B1* | 8/2007 | Andre | G06Q 10/06311 | 705/7.14 |
| 7,729,935 B2* | 6/2010 | Theiler | G06Q 10/06311 | 705/7.27 |
| 7,769,617 B2* | 8/2010 | Iwasaki | G06Q 10/063112 | 340/521 |
| 8,346,569 B2* | 1/2013 | Schneiderman | G06Q 30/08 | 705/1.1 |
| 9,245,257 B2* | 1/2016 | McConnell | G06Q 10/0639 | |
| 2002/0040313 A1* | 4/2002 | Hunter | G06Q 10/06 | 705/7.13 |
| 2002/0077884 A1* | 6/2002 | Sketch | G06Q 10/10 | 705/12 |
| 2002/0156674 A1* | 10/2002 | Okamoto | G06Q 10/1053 | 705/321 |
| 2003/0139955 A1* | 7/2003 | Kirii | G06Q 10/063114 | 705/7.15 |
| 2004/0117046 A1* | 6/2004 | Colle | G06Q 10/06 | 700/99 |
| 2004/0133889 A1* | 7/2004 | Colle | G06Q 10/06 | 718/100 |
| 2004/0138939 A1* | 7/2004 | Theiler | G06Q 10/06311 | 705/7.27 |
| 2004/0158568 A1* | 8/2004 | Colle | G06Q 10/06 | |
| 2004/0254805 A1* | 12/2004 | Schwerin-Wenzel | G06Q 10/10 | 705/36 R |
| 2005/0096973 A1* | 5/2005 | Heyse | G06Q 10/105 | 705/7.39 |
| 2005/0119928 A1* | 6/2005 | Deitrich | G06Q 10/063112 | 705/7.14 |
| 2005/0119929 A1* | 6/2005 | Deitrich | G06Q 10/063112 | 705/7.14 |
| 2005/0159968 A1* | 7/2005 | Cozzolino | G06Q 10/00 | 705/7.17 |
| 2007/0192157 A1* | 8/2007 | Gooch | G06Q 10/063112 | 705/7.14 |
| 2008/0027783 A1* | 1/2008 | Hughes | G06Q 10/00 | 705/7.14 |
| 2008/0201167 A1* | 8/2008 | Eggenberger-Wang | G06Q 10/06 | 705/2 |
| 2010/0153289 A1* | 6/2010 | Schneiderman | G06Q 10/105 | 705/320 |
| 2011/0276356 A1* | 11/2011 | Smith | G06Q 10/06 | 705/7.13 |
| 2013/0013361 A1* | 1/2013 | Frazier | G06Q 10/1053 | 705/7.14 |
| 2013/0198098 A1* | 8/2013 | Schneiderman | G06Q 10/105 | 705/320 |
| 2014/0278821 A1* | 9/2014 | McConnell | G06Q 10/0639 | 705/7.38 |

* cited by examiner

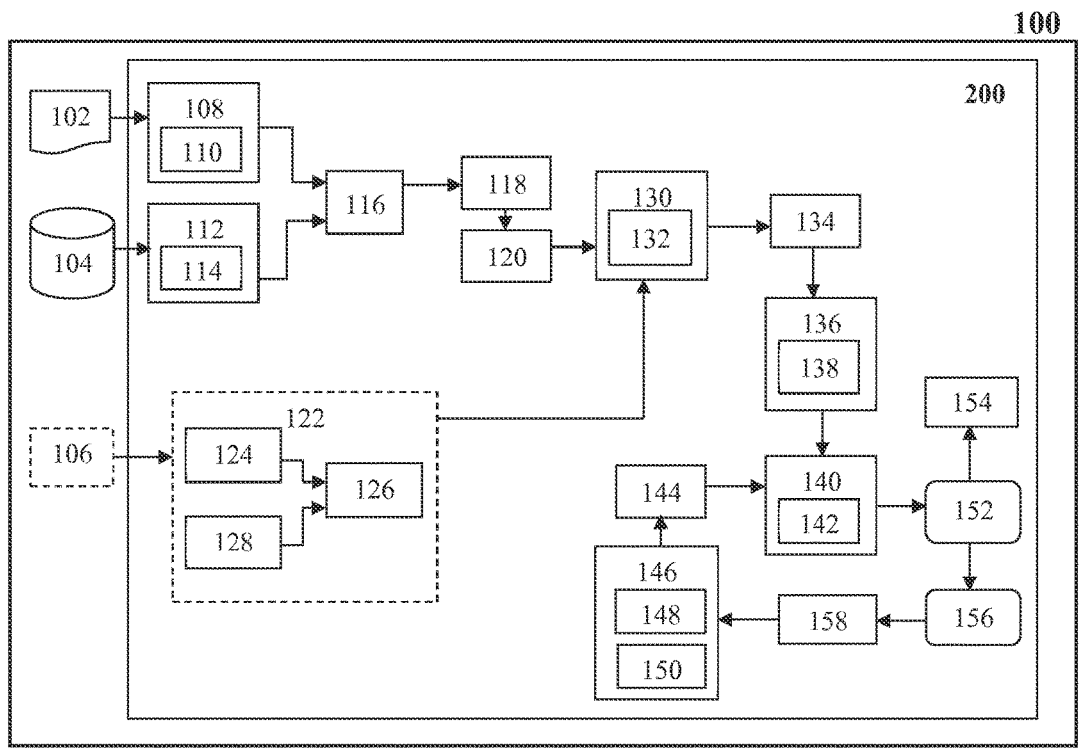

COMPUTER IMPLEMENTED METHOD AND SYSTEM TO IDENTIFY LEADERS IN VARIOUS WORKGROUPS

FIELD OF DISCLOSURE

The present disclosure relates to the field of leader identification within an organization.

Particularly, this disclosure relates to a computer implemented system to identify leaders in various workgroups of an organization or enterprise, based on their digital persona, which is compared to the persona of known leaders in respective fields to form a leadership score. The resulting leadership pipeline assists in deciding the next-in-line leader.

Definitions of Terms Used in the Specification

The term 'tacit knowledge' used hereinafter in this specification relates to the employee information that is not explicitly available.

The term 'explicit knowledge' used hereinafter in this specification relates to the employee information that is specifically available.

The term 'attribute' used hereinafter in this specification relates to the characteristics of a particular individual that establish or disestablish him as a leader.

The term 'collaborative assessment' used hereinafter in this specification relates to the tacit knowledge harvested from the feedback/evaluation of an employee by his peers, superiors and juniors.

BACKGROUND

Conventionally, the identification of leaders starts with human nomination, either by a supervisor or by peer recommendation. This method suffers from limitations like recency or primacy effect and subjective bias. Recency bias occurs when an assessor is immensely influenced by the information that is presented later (more recently) rather than the earlier one in any given selection process. In contrast, primacy bias occurs when an assessor's selection is made based on information that was presented earlier (primary information) rather than later in a process. Along with such limitations, superiors or peers tend to rely mostly on the past performance as a key indicator in deciding the future leaders. Also, for potential leadership, all the employees are not considered, instead, only the profiles of short-listed/nominated individuals are considered.

A strong leadership pipeline must attract, retain and develop the leaders throughout the organization, right from project team leader to general manager to top executive. This results in an efficient succession management system that provides opportunities to the home grown leaders to move up in the organization-pyramid, it also increases their morale and prevents them from leaving the organization. This in-turn assists organizations to deal with high potential attrition and allows them to focus on organizational excellence. Thus, there is a need for an automated system which eliminates/minimizes the manual process of leader selection and assesses all employee profiles as potential leaders.

OBJECTS

It is an object of the present disclosure to provide a well-designed system for succession management in organizations.

Yet another object of the present disclosure is to avoid the subjective bias in the leader selection process.

Another object of the present disclosure is to eliminate/minimize personal involvement of employees in the selection process.

Other objects and advantages of the present invention will be more apparent from the following description when read in conjunction with the accompanying figures, which are not intended to limit the scope of the present disclosure.

SUMMARY

The present disclosure envisages a computer implemented system for identifying leaders in an organization.

Typically, in accordance with the present disclosure, the system for identifying leaders in various workgroups includes a system processor that provides system processing commands. The system includes a reference repository for storing attributes and attribute values of different known leaders. A second operational processor present in the system cooperates with the system processor and is configured to communicate with the reference repository. This second operational processor includes a first sorter operating under sorting commands and an editor operating under editing commands of the second operational processor. The first sorter is configured to sort the known leaders in the reference repository according to their ranking in their field of activity, and the editor is configured to store attributes into the reference repository and edit the stored attributes and, update the list of known leaders and their attributes and fields in the reference repository by addition or deletion. The system further includes a digital persona repository configured to store dynamically the attributes of individuals whose leadership qualities need to be ascertained in their individual fields of activity. Furthermore, in accordance with the present disclosure, the system includes data miners comprising:
  i. a first data miner configured with a data crawler and cooperating with the system processor to mine internal data in an organization associated with an individual, who figures in the digital persona repository, the internal data including the organizations' employee databases, human resource systems, performance management systems, e-mail conversations, employee logsheets, employee goals and deliverables; and
  ii. a second data miner configured with a web crawler and cooperating with the system processor to mine publically available external data relating to the individual including his/her social networking routine (LinkedIn, Facebook, Twitter, MySpace and the like).

Additionally, the system includes a temporary data storage repository for receiving data mined, in respect of the individual, by the first and second data miners in response to commands from the system processor. The system also comprises a tagger which is responsive to commands from the system processor. The tagger is configured to tag the received data in the temporary data storage repository mined in respect of the individual corresponding to the attributes of known leaders in a corresponding field of activity to generate tagged data. A validator present in the system is also responsive to commands from the system processor and is configured to validate from the received data, correct identity of the individual and related appropriate content of the validated individual. A first operational processor cooperating with the system processor is configured to receive the validated tagged data. The first operational processor includes an extractor crawler operating under the commands of the first operational processor, and is configured to crawl over the validated tagged data and extract tagged attributes. The first operational processor is configured to then compute values for discrete attributes for the individual depending upon tagging frequency. The system also includes a storer that cooperates with the system processor and is configured to receive discrete attribute values for the individual and store in an individual digital persona folder the discrete attribute values in the digital persona repository. A third operational processor present in the system cooperates with the system processor and includes a comparator operating under the commands of the third operational processor to receive the digital persona of the individual along with his attributes and their discrete values and also receive a list of leaders in the individual's field of activity ranked according to their individual attribute values. The comparator executes comparison commands given by the third operational processor to compare the value of a particular attribute of the individual with the value of the same attribute of each of the known leaders in a field of activity to determine the rank of the individual in relation to the list of leaders. The system also includes a display that cooperates with the system processor to display the attribute ranking of the individual with respect to all the attributes of known leaders in a field of activity and the leadership rank of the individual with respect to a list of ranked known leaders. Further, the system also includes a weightage setter that cooperates with the system processor and is configured to allot weightages to each of the attributes, the third processor is configured to generate a total attribute value computed by the summation of the individual discrete weighted attribute values of an individual in the digital persona repository which is a multiple of the weight of the leaders in the reference repository allotted to the attribute and the frequency of the attribute in the mined data. The system also includes a second sorter that is responsive to commands from the system processor and is configured to sort individuals in the digital persona repository in accordance with their total attribute value. Furthermore, in accordance with the present disclosure, the system includes:

i. a plurality of feedback templates configured to be distributed to a plurality of other individuals such as peers, supervisors and juniors associated with the individual whose leadership qualities are to be evaluated, the templates being further adapted to be marked with identifiers determining the value of attributes to be assigned to the individual by the other individuals;

ii. a weightage allotter configured to allot a weight to each other individual responder of the template in relation to the individual;

iii. a reader configured to read the identifier markings on the templates, the reader having an extractor adapted to extract the marked identified attribute values; and iv. a fourth operational processor cooperating with the system processor and configured to receive the marked identified attribute values from each of the other individuals and the weight allotted to each of the other individuals and compute weighted identified attribute values for the individual to be uploaded in the digital persona repository.

Additionally, in accordance with the present disclosure, the system includes an aggregator cooperating with the system processor and configured to receive the weighted identified attribute values for the individual and the discrete attribute values and further configured to obtain a cumulative score by summing up the attribute values and multiplying those values against the weightages of the attribute values.

In accordance with the present invention, there is provided a computer implemented method for identifying leaders in various workgroups, the computer implemented method includes system processing commands and comprises the following steps:

creating a reference repository for storing attributes and attribute values of numerous known leaders related to the field of activity;

creating a digital persona repository for storing digital persona of individuals based on attributes and attribute values related to the field of activity;

identifying known leaders in relevant field of activity;

determining a set of attributes associated with exceptional leaders in a particular field of activity;

determining the attributes of known leaders and their attribute values;

aborting the known leaders from the reference repository by sorting the attributes and the attribute values based on ranking of the known leaders in their field of activity;

identifying individuals from the organization that are eligible to be potential leaders;

mining internal data associated with the identified individual within an organization based on system processing commands;

mining publically available external data associated with the identified individual based on system processing commands;

temporarily storing received internal and external mined data in a temporary storage facility in response to system processing commands;

generating tagged data in response to system processing commands by tagging the data received from the temporary storage facility with respect to the set attribute tags of known leaders in the corresponding field of activity;

validating the tagged data to obtain appropriate relevant information corresponding to the identified individual in response to system processing commands;

extracting based on system processing commands the attributes from the validated tagged data and processing the validated tagged data by computing values for discrete attributes for the individual based on tagging frequency;

receiving discrete attribute values for the individuals and dynamically storing, the discrete attribute values of the individuals whose leadership qualities need to be ascertained in their individual fields of activity, in the digital persona repository;

computing based on system processing commands a cumulative score for the individual by summing the weighted identified attribute values and the discrete attribute values obtained for each of the attributes and multiplying them with the weightages of received attributes, in the digital persona repository;

comparing based on system processing commands the cumulative score of a particular attribute of the individual from the created digital persona repository with the value of the same attribute of each of the known leaders in the field of activity from the reference repository to obtain the leadership score;

obtaining the leader ranking of the individual in relation to the list of leaders based on the comparison and accordingly ranking the individual in digital persona repository and reference repository;

editing/updating the stored attributes by adding or deleting the leaders and their attributes and fields from the list of known leaders; and displaying based on system processing commands the attribute ranking of the individual with respect to all attributes of known leaders in a field of activity and displaying the leadership rank of the individual with respect to a list of ranked known leaders.

Typically, in accordance with the present disclosure, the method of identifying leaders includes setting weightage to each of the attributes and computing total attribute value by summation of individual discrete weighted attribute values and the frequency of attribute in the mined data in response to system processing commands.

Further, in accordance with the present disclosure, the step of sorting includes sorting in response to system processing commands, individuals in the digital persona repository depending on their total attribute value.

Still further, the step of collaboratively assessing an individual includes step of distributing based on system processing commands, a plurality of feedback templates to a plurality of individuals such as supervisors and peers associated with the individual whose leadership qualities are to be assessed.

Furthermore, the step of assessing an individual includes step of marking based on system processing commands, the pre-determined feedback templates with identifiers, determining the value of attributes to be assigned to the individual by other individuals depending on the weightages allotted to the other individual responder of the template in relation to the individual whose leadership qualities are to be evaluated.

Additionally, in accordance with the present disclosure, the method includes steps of receiving marked identified attribute values and their weightages and computing weighted identified attribute values for the individuals to be uploaded in the digital persona repository in response to system processing commands.

Preferably, the method further includes the step of aggregating in response to system processing commands, the weighted identified attribute values for the individual and the discrete attribute values, to compute corrected discrete attribute values.

BRIEF DESCRIPTION OF THE ACCOMPANYING DRAWING

The computer implemented system and method for leader identification in various workgroups of an organization will now be described with reference to the non-limiting, accompanying drawing, in which:

FIG. 1 illustrates a schematic of the system for leader identification in an organization in accordance with this disclosure.

DETAILED DESCRIPTION

The computer implemented system and method to identify leaders in various workgroups will now be described with reference to the accompanying drawing which does not limit the scope and ambit of the disclosure. The description provided is purely by way of example and illustration.

The system in accordance with the present disclosure makes it possible for organizations to identify leaders within different workgroups without subjecting the employees to any type of bias. The computer implemented system employs two repositories to store the information related to all the employees and the existing or known leaders. The information is stored in the form of attributes such that the attributes and their values help in identifying the potential of an individual as a leader in a particular field of activity. A list of a few parameters on which the attributes for finding leadership ability of an individual can be based, is provided in the following TABLE 1:

TABLE 1

| Category | Attributes based on | Information Source Type |
|---|---|---|
| Supervisor Remarks | Leadership Program Mentor Name | Internal |
| | Supervisor Remarks | Internal |
| Associate Remarks | Career Aspiration Form | Internal |
| Leadership Remarks | Leadership Connectivity Remarks | Internal |
| Awards | Awards | Internal |
| Input from External Social Network | LinkedIn | External |
| Leadership of Business | Business Acumen | Internal |
| | Dealing With Ambiguity | Internal |
| | Functional Excellence | Internal |
| | Managing Vision And Purpose | Internal |
| | Strategic Capability | Internal |
| Leadership of People | Building Effective Teams | Internal |
| | Interpersonal Effectiveness | Internal |
| | People Development | Internal |
| | Taking Ownership | Internal |
| | Withstanding Pressure | Internal |
| Leadership of Results | Customer Focus | Internal |
| | Drive For Results | Internal |
| | Effective Communication | Internal |
| | Innovation Management | Internal |
| | On time Delivery | Internal |
| | Service Quality | Internal |
| | Customer Satisfaction Index | Internal |
| | Timely Decision Making | Internal |
| Social feature | Like | Internal/External |
| | Recommend | Internal/External |
| | Service Quality | Internal |
| | Customer Satisfaction Index | Internal |
| | Target Vs. Achievement Ratio (Revenue) | Internal |

The available data is then compared to obtain a leadership score based on which the leader is selected.

Referring to the accompanying drawing, FIG. 1 shows a schematic of the computer implemented system 100 to identify leaders in different workgroups within an organization. The system includes a system processor 200 that provides processing commands to the system 100. The system comprises two main repositories namely a Reference repository 144 and a Digital persona repository 136.

In accordance with one aspect of the present disclosure, the system 100 cooperates with the system processor to provide digital persona of employees based on explicit and tacit knowledge gathered from organization's internal database 102, employees' social habits from social knowledge 104 and from the collaborative assessment enabler 122. Based on this digital persona, the employees are compared with the existing leaders to select the best leaders among them. The information about the existing leaders is fed and timely updated in the Reference repository 144.

The system 100 is capable of extracting data from multiple sources in order to create a digital persona of the employee. A first data miner 108 present in the system 100 is configured with a data crawler 110 and cooperates with the system processor 200 to gather data related to employees based on the organizational knowledge from an organization's internal database 102. The system also includes a second data miner 112 that cooperates with the system processor 200 and includes a web crawler 114 to crawl and mine publically available external data relating to the employees from social knowledge 104. The organizational knowledge is extracted from the organizations' employee database, human resource management system, learning management system, knowledge management system, e-mail conversations and the like. This extracted data is typically in a structured format since it is extracted from Excel, XML, Oracle, web services, flat files and the like. The social knowledge 104 regarding an employee is obtained by extracting information like employees inter-personal skills, personal background, work history and the like, from his social networking habits/routine (profiles on LinkedIn, Facebook, Twitter, MySpace and the like). This social knowledge 104 may be in structured or unstructured form.

Considering an example where 'integrity' of an employee is analyzed as an attribute in determining the potential of that employee as a leader in a specific workgroup, the first data miner 108 with the help data crawler 110 will crawl over the data related to the employee available from employee's organization's internal database 102 and the second data miner 112 with the help of the web crawler 114 will crawl over the data from external social networking sources available from social knowledge 104 to extract all the data related to the attribute 'integrity'. This internal and external data mined by the first and second data miner is stored temporarily in a temporary data storage repository for further processing.

When the location of the information sources 102 and 104 is specified, the data crawler 110 and the web crawler 114 utilize pattern matching techniques to identify the structured and unstructured data, and then mine the appropriate data from the sources 102 and 104. This mined data is in terms of the relevant employee attributes that are important characteristics of a leader. A tagger 118 present in the system 100 is responsive to commands from the system processor 200 and automatically tags the employee information (available from the temporary data storage repository 116) to the attribute of known leaders in a corresponding field of activity to generate tagged data. This tagged data is received by a validator 120 which is responsive to commands form the system processor 200. The validator 120 employs filtering and tag validation to validate from the received tagged data, the correct identity of the individual and related appropriate content of the validated individual. Tag validation involves identity validation and content validation. Identity validation of an employee is performed by confirming if the right employee is selected in order to gather the correct information related to the employee. Accordingly, mined data is examined to select only the relevant content.

For example, the attribute 'integrity' will be searched by the tagger 118 from the temporary data storage repository 116 for its frequency of occurrence. Based on the number of times the attribute 'integrity' appears in the relevant mined data, the tagger 118 will tag and the validator 120 will validate and compute a discrete value against 'integrity'. If 'integrity' is present in the relevant mined data 10 times, and the source of data has a weightage of 4, the weighted attribute value for 'integrity' will be 40.

The validator 120 validates the mined tagged data to obtain validated tagged data. A first operational processor 130 present in the system 100 cooperates with the system processor 200 and is configured to receive the validated tagged data. An extractor crawler 132 is included in the first operational processor 130 that operates under the commands of the first operational processor 130 and crawls over the validated tagged data to extract tagged attributes. The first operational processor computes values for discrete attributes for the employee depending upon the tagging frequency.

A collaborative assessment enabler 122 allows peer members, supervisors and the like to assess the employee as a potential leader. Feedback questionnaire 106 is a set of pre-selected questionnaire that is shared with the assessors (via e-mail) in order to understand their responses and experiences related to the potential leader. The feedback questionnaire 106 is sent only to the assessors/responders who have previously worked with the leadership candidate. The feedback obtained by the feedback questionnaire 106 is marked with identifiers for determining the value of attributes assigned to the employee by the assessors. This feedback is provided to the collaborative assessment enabler 122. The collaborative assessment enabler 122 includes a weightage allotter 128 that allots a weight to the assessor in relation to the employee (potential leader). Thus this feedback varies based on the position of assessor in the organization's hierarchy. The collaborative assessment enabler 122 also includes a reader 124 that is configured to read the identifier markings on the feedback and extract the marked identified attribute values. These marked identified attribute values are received by a fourth operational processor 126 present in the collaborative assessment enabler 122. The fourth operational processor 126 cooperates with the system processor 200 to receive the marked identified attribute values from each of the other assessors and the weight allotted to each of the other assessor and compute weighted identified attribute values for the employee. This weighted identified attribute values is then received by the first operational processor 130 for further processing. The outcome of the assessment enabler 122 is weighted identified attribute values (social collaboration score) of the employee and it contributes in creating employee's digital persona. The social collaboration score is computed as follows:

$$\text{Social Collaboration Score} = \Sigma_{j=1}^{m}(\varphi_j * Y_j)$$

where φj is the weightage allotted to the assessor who provides feedback, Yj is value of the collaborative assessment and j is the feedback of the individual. The organization can also create rules to allocate specific weightage for each individual collaboration method based on the assessor's designation. In such case, the social collaboration score can be calculated as follows:

$$\text{Social Collaboration score} = \text{Weightage of designation} \\ (\text{Score of the feedback Category} * \text{weightage})$$

Considering the previous example, if the employee is analyzed for his 'integrity', the feedback template will have a field named 'integrity' and pre-determined values for 'integrity' against the field. The supervisors and peer members, who are selected for assessing the employee for leadership, will have to select from a pre-determined value for 'integrity' of the employee in question. If a supervisor and a peer member have selected a rating '5' to determine 'integrity' of the employee in question, the value marked by the supervisor will be weighted more than that marked by his peer. So if weightage of supervisor is 7 and that of the peer is 4, the score given by the supervisor for 'integrity' of the said employee will be valued 35 whereas, the score given by the peer for the employee's 'integrity' will be 20. This social collaboration score is eventually stored as the attribute value in the digital persona repository 136.

The system 100 includes a storer 134 which cooperates with the system processor 200 to receive the discrete attribute values and the social collaboration score for the employee from the first operational processor 130, and store in an individual digital persona folder in the digital persona repository 136, the discrete attribute values and the social collaboration score. The digital persona repository 136 maintains the information related to all the employees in the form of attributes that are important in deciding the potential of an employee as a leader. This employee information in the digital persona repository 136 is then sorted thereby sorting the employees in accordance with their total attribute values. The sorting is carried out by a second sorter 138 that cooperates with the digital persona repository 136 and is responsive to commands from the system processor 200. Different attributes have different weightages according to various streams and roles in the organization. For example, an attribute analyzing mathematical skills of an employee may be more relevant in the field of accounting than in the computer programming field and, hence, will have more weightage in the accounting field. Based on the attributes and their weightage, the digital persona repository 136 provides a complete profile of an associate/employee along with the associate attributes/capabilities. A digital persona score of an individual can be calculated by using the following formula:

$$\text{Digital Persona Score} = \Sigma_{i=1}^{n}(w_i * X_i)$$

where $w_i$ is weight of the attribute, $X_i$ is quantitative value of the attribute and i refers to the particular attribute.

In continuation with the previous example, if 'integrity' is one of the attributes and 'efficiency' is another, the attribute ranking of an employee will be based on the summation of 'integrity' and 'efficiency' attribute values along with the other attribute values.

The reference repository 144 maintains a record of the attributes of known/existing leaders. The attribute weightage is variable based on its significance to the position. The employees are compared with the existing leaders by a comparator 142 to identify best leaders among them. A third operational processor 140 present in the system 100 cooperates with the system processor 200 to receive the digital persona of the employee along with his attributes and their discrete values and also receive list of known leaders in the employee's field of activity ranked according to their individual attribute values. The third operational processor 140 includes the comparator 142 that executes comparison commands given by the third operational processor 140 to compare the value of a particular attribute of the employee with the value of the same attribute of each of the known leaders in a field of activity to determine the a leadership score 152 which gives the rank of the employee in relation to the list of leaders. The leadership ranking based on the leadership score 152 is displayed on the display 154. Based on the leadership score 152, a leadership identifier 156 determines the suitable employee for the leadership position.

The information in the reference repository 144 is updated by an editor 150 on a regular interval based on the recently identified leaders. The record of the attributes of known/existing leaders in the reference repository 144 is sorted by a first sorter 148 included in a second operational processor 146. The second operational processor 146 cooperates with the system processor 200 and is configured to communicate with the reference repository 144 in order to update the reference repository 144. The second operational processor 146 provides sorting commands to the first sorter 148 to sort the known leaders in the reference repository 144 according to their ranking in their field of activity. The editor 150 operates under the editing commands from the second operational processor 146 to store and edit the attributes of known leaders and update the list of known leaders and their attributes and fields, by addition or deletion. The editor 150 utilizes the identified leader's information to heuristically re-engineer the attribute weightage from the reference repository 144. As a result, the leadership ranking varies continuously and best performed employees are selected to be the leaders.

Technical Advantages

The technical advantages of the system and method of the present disclosure include:
providing a computer implemented system to identify leaders in an organization;
providing a computer implemented system that eliminates or reduces human intervention in leader selection process;
providing a computer implemented system that avoids subjective bias in leader selection process; and
providing a computer implemented system that continuously (daily or weekly) updates the leadership score of employees thus providing increased opportunities.

While considerable emphasis has been placed herein on the particular features of this disclosure, it will be appreciated that various modifications can be made, and that many changes can be made in the preferred embodiment without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

The invention claimed is:

1. A computer implemented system for leader identification, said system including a system processor, said system comprising:

i. a reference repository for storing attributes and attribute values of different known leaders related to a field of activity;

ii. a second operational processor cooperating with the system processor, said second operational processor configured to communicate with the reference repository, said second operational processor including a first sorter operating under sorting commands and an editor operating under editing commands of the second operational processor, said first sorter configured to sort known leaders in the reference repository according to their ranking in their field of activity, said editor configured to store attributes into said reference repository and edit said stored attributes and further configured to update a list of known leaders and their attributes and fields in said reference repository by addition or deletion;

iii. a digital persona repository configured to store dynamically the attributes of individuals whose leadership qualities need to be ascertained in their individual fields of activity;

iv. a first data miner configured with a data crawler and cooperating with the system processor to mine internal data in an organization associated with an individual, who figures in said digital persona repository, said internal data including the organizations' employee databases, human resource systems, performance management systems, e-mail conversations, employee logsheets, employee goals and deliverables;

v. a second data miner configured with a web crawler and cooperating with the system processor to mine publically available external data relating to said individual including his/her social networking routine;

vi. a temporary data storage repository for receiving data mined, in respect of the individual, by the first and second data miners in response to commands from the system processor;

vii. a tagger responsive to commands from the system processor and configured to tag the received data in the temporary data storage repository mined in respect of the individual corresponding to the attributes of the known leaders in a corresponding field of activity to generate tagged data;

viii. a validator responsive to commands from the system processor and configured to validate from the received data, correct identity of the individual and related appropriate content of the validated individual;

ix. a first operational processor cooperating with the system processor, said first operational processor configured to receive the validated tagged data, said first operational processor including an extractor crawler operating under the commands of the first operational processor, said extractor crawler configured to crawl over the validated tagged data and extract tagged attributes, said first operational processor configured to compute values for discrete attributes for the individual depending upon tagging frequency;

x. a storer cooperating with the system processor, said storer configured to receive discrete attribute values for the individual and store in an individual digital persona folder the discrete attribute values in the digital persona repository;

xi. a weightage setter cooperating with the system processor, said weightage setter configured to allot weightages to each of the attributes;

xii. a third operational processor cooperating with the system processor, said third operational processor includes a comparator operating under the commands of the third operational processor, said comparator configured to receive the digital persona of the individual along with his attributes and their discrete values and also receive the list of leaders in the individual's field of activity ranked according to their individual attribute values and execute comparison commands given by the third operational processor to compare the value of a particular attribute of the individual with the value of the same attribute of each of the known leaders in a field of activity to determine the rank of the individual in relation to the list of leaders, said third operational processor further configured to generate a total attribute value computed by the summation of the individual discrete weighted attribute values of the individual in the digital persona repository which is a multiple of the weight of the leaders in the reference repository allotted to the attribute and the frequency of the attribute in the mined data; and xiii. a display cooperating with the system processor, said display configured to display the attribute ranking of the individual with respect to all the attributes of the known leaders in the field of activity and the leadership rank of the individual with respect to a list of ranked known leaders.

2. The system as claimed in claim 1, which includes a second sorter responsive to commands from the system processor, said second sorter configured to sort individuals in the digital persona repository in accordance with their total attribute value.

3. The system as claimed in claim 1, which includes:
i. a plurality of feedback templates configured to be distributed to a plurality of other individuals such as peers, supervisors and juniors associated with the individual whose leadership qualities are to be evaluated, said templates being further adapted to be marked with identifiers determining the value of attributes to be assigned to the individual by the other individuals;
ii. a weightage allotter configured to allot a weight to each other individual responder of the template in relation to the individual;
iii. a reader configured to read the identifier markings on said templates, said reader having an extractor adapted to extract said marked identified attribute values; and
iv. a fourth operational processor cooperating with the system processor and configured to receive the marked identified attribute values from each of the other individuals and the weight allotted to each of the other individuals and compute weighted identified attribute values for the individual to be uploaded in the digital persona-repository.

4. The system as claimed in claim 2, which includes an aggregator cooperating with the system processor, said aggregator configured to receive the weighted identified attribute values for the individual and the discrete attribute values and further configured to obtain a cumulative score by summing up the attribute values and multiplying those values against the weightages of the attribute values.

5. A computer implemented method for identifying leaders in various workgroups, said computer implemented method including system processing commands and comprising the following steps:
storing, by a reference repository, attributes and attributes values of different known leaders related to the field of activity;
storing, by a digital persona repository, digital persona of individuals based on attributes and attribute values related to the field of activity;
identifying known leaders in a relevant field of activity;
determining the attributes of known leaders and their attribute values;
sorting the known leaders from the reference repository by sorting the attributes and the attribute values based on ranking of the known leaders in their field of activity;
identifying individuals from an organization that are eligible to be potential leaders;
mining internal data associated with the identified individual within the organization based on system processing commands;
mining publically available external data associated with the identified individual based on the system processing commands;
temporarily storing received internal and external mined data in a temporary data storage repository in response to system processing commands;
generating tagged data in response to the system processing commands by tagging the data received from the temporary data storage repository with respect to the set attribute tags of known leaders in the corresponding field of activity;
validating the tagged data to obtain appropriate relevant information corresponding to the identified individual in response to the system processing commands;
extracting based on the system processing commands, the attributes from the validated tagged data and processing the validated tagged data by computing values for discrete attributes for the individual based on tagging frequency;
receiving discrete attribute values for the individuals and dynamically storing, the discrete attribute values of the individuals whose leadership qualities need to be ascertained in their individual fields of activity, in the digital persona repository;
computing, based on the system processing commands, a cumulative score for the individual by summing the weighted identified attribute values and the discrete attribute values obtained for each of the attributes and multiplying them with the weightages of the received attributes, in the digital persona repository;
setting weightage to each of the attributes and computing total attribute value by summation of individual discrete weighted attribute values and the frequency of attribute in the mined data, in response to system processing commands;
comparing, based on the system processing commands, the cumulative score of a particular attribute of the said individual from the created digital persona repository with the value of the same attribute of each of the known leaders in the field of activity from the reference repository to obtain the leadership score;
obtaining the leader ranking of the said individual in relation to the list of leaders based on the comparison and accordingly ranking the individual in the digital persona repository and the reference repository;
editing/updating the stored attributes by adding or deleting the leaders and their attributes and fields from the list of known leaders; and
displaying, based on system processing commands, the attribute ranking of the individual with respect to all attributes of known leaders in the field of activity and displaying the leadership rank of the individual with respect to a list of ranked known leaders.

6. The method as claimed in claim 5, wherein said method further includes a step of sorting in response to system processing commands, individuals in the digital persona repository depending on their total attribute value.

7. The method as claimed in claim 5, wherein said method collaboratively assesses the individual, by distributing a plurality of feedback templates to a plurality of individuals such as supervisors and peers associated with the individual whose leadership qualities are to be assessed.

8. The method as claimed in claim 7, wherein said individual, in response to the system processing commands, is assessed by marking said pre-determined feedback templates with identifiers determining the value of attributes to be assigned to said individual by other individuals depending on the weightages allotted to the other individual responder of the template in relation to the individual whose leadership qualities are to be evaluated.

9. The method claimed in claim 7, wherein said method includes a step of receiving in response to the system processing commands, marked identified attribute values and their weightages and computing weighted identified attribute values for the individuals to be uploaded in the digital persona repository.

10. The method claimed in claim 7, wherein said method further includes a step of aggregating in response to the system processing commands, the weighted identified attribute values for the individual and the discrete attribute values, to compute corrected discrete attribute values.

\* \* \* \* \*